United States Patent
Hatz et al.

(10) Patent No.: US 6,566,783 B2
(45) Date of Patent: May 20, 2003

(54) PERMANENT MAGNET GENERATOR HAVING INTERNAL STATOR WITH ADJUSTABLE AIR GAP

(75) Inventors: Ernst Hatz, Ruhstorf/Rott (DE); Franz Moser, Schardenberg (AT)

(73) Assignee: Motorenfabrik Hatz GmbH & Co., KG, Ruhstorf/Rott (DE)

( * ) Notice: Subject to any disclaimer, the term of this patent is extended or adjusted under 35 U.S.C. 154(b) by 0 days.

(21) Appl. No.: 09/937,421

(22) PCT Filed: Mar. 2, 2001

(86) PCT No.: PCT/EP01/02368
§ 371 (c)(1),
(2), (4) Date: Dec. 13, 2001

(87) PCT Pub. No.: WO01/65669
PCT Pub. Date: Sep. 7, 2001

(65) Prior Publication Data
US 2002/0153798 A1 Oct. 24, 2002

(30) Foreign Application Priority Data
Mar. 2, 2000 (DE) .......................... 100 10 248

(51) Int. Cl.$^7$ ................................................ H02K 7/18
(52) U.S. Cl. .................. 310/254; 310/190; 310/191; 322/49; 322/50; 322/52
(58) Field of Search ................. 310/254, 191, 310/112, 68 B, 168, 171, 190; 322/49, 50, 51, 52

(56) References Cited

U.S. PATENT DOCUMENTS

| 263,134 A | * | 8/1882 | Edison ......................... 322/27 |
| 996,253 A | * | 6/1911 | Johnson ....................... 310/191 |
| 3,443,135 A | * | 5/1969 | Lombard ..................... 310/191 |
| 3,713,015 A | * | 1/1973 | Frister ......................... 322/28 |
| 4,027,229 A | | 5/1977 | Frink |
| 4,305,031 A | * | 12/1981 | Wharton ........................ 322/29 |
| 4,371,801 A | * | 2/1983 | Richter .................. 310/156.36 |
| 4,578,609 A | * | 3/1986 | McCarty ................ 310/156.24 |
| 4,654,577 A | * | 3/1987 | Howard ........................ 322/28 |
| 4,766,362 A | * | 8/1988 | Sadvary ........................ 322/50 |
| 4,882,513 A | * | 11/1989 | Flygare et al. .............. 310/114 |
| 4,885,493 A | | 12/1989 | Gokhale |
| 4,959,605 A | * | 9/1990 | Vaidya et al. ................. 322/10 |
| 5,260,642 A | * | 11/1993 | Huss ............................. 322/51 |
| 5,767,601 A | * | 6/1998 | Uchiyama .................... 310/190 |
| 6,249,069 B1 | * | 6/2001 | Krueger ........................ 310/74 |
| 6,455,975 B1 | * | 9/2002 | Raad et al. .................. 310/209 |
| 6,472,788 B1 | * | 10/2002 | Nakano ....................... 310/114 |
| 2002/0153791 A1 | * | 10/2002 | Hatz et al. .................... 310/91 |
| 2002/0153798 A1 | * | 10/2002 | Hatz et al. .................... 310/91 |

FOREIGN PATENT DOCUMENTS

| DE | 4237343 | | 5/1994 | |
| GB | 228316 | * | 2/1925 | ................. 310/190 |

* cited by examiner

Primary Examiner—Nestor Ramirez
Assistant Examiner—David W. Scheuermann
(74) Attorney, Agent, or Firm—Katten Muchin Zavis Rosenman

(57) ABSTRACT

In a power generator unit composed of a generator and a piston internal combustion engine as the drive, the rotor is driven by the crankshaft of the diesel engine, and carries permanent magnets to excite the generator while the stator of the generator is arranged within the rotor and carries the rotor winding of the generator. The stator of the generator is divided, for the purpose of voltage regulation, into an outside stator part that forms an air gap with the rotor, and an inside stator part that forms a control air gap with the outside stator part that surrounds it, and is mounted to rotate, relative to the outside stator part, in such a manner that the geometry of the control air gap changes with the rotational position, and that the rotation takes place as a function of the variations in the terminal voltage of the generator.

8 Claims, 5 Drawing Sheets

PERMANENT MAGNET GENERATOR HAVING INTERNAL STATOR WITH ADJUSTABLE AIR GAP

Figure 1:
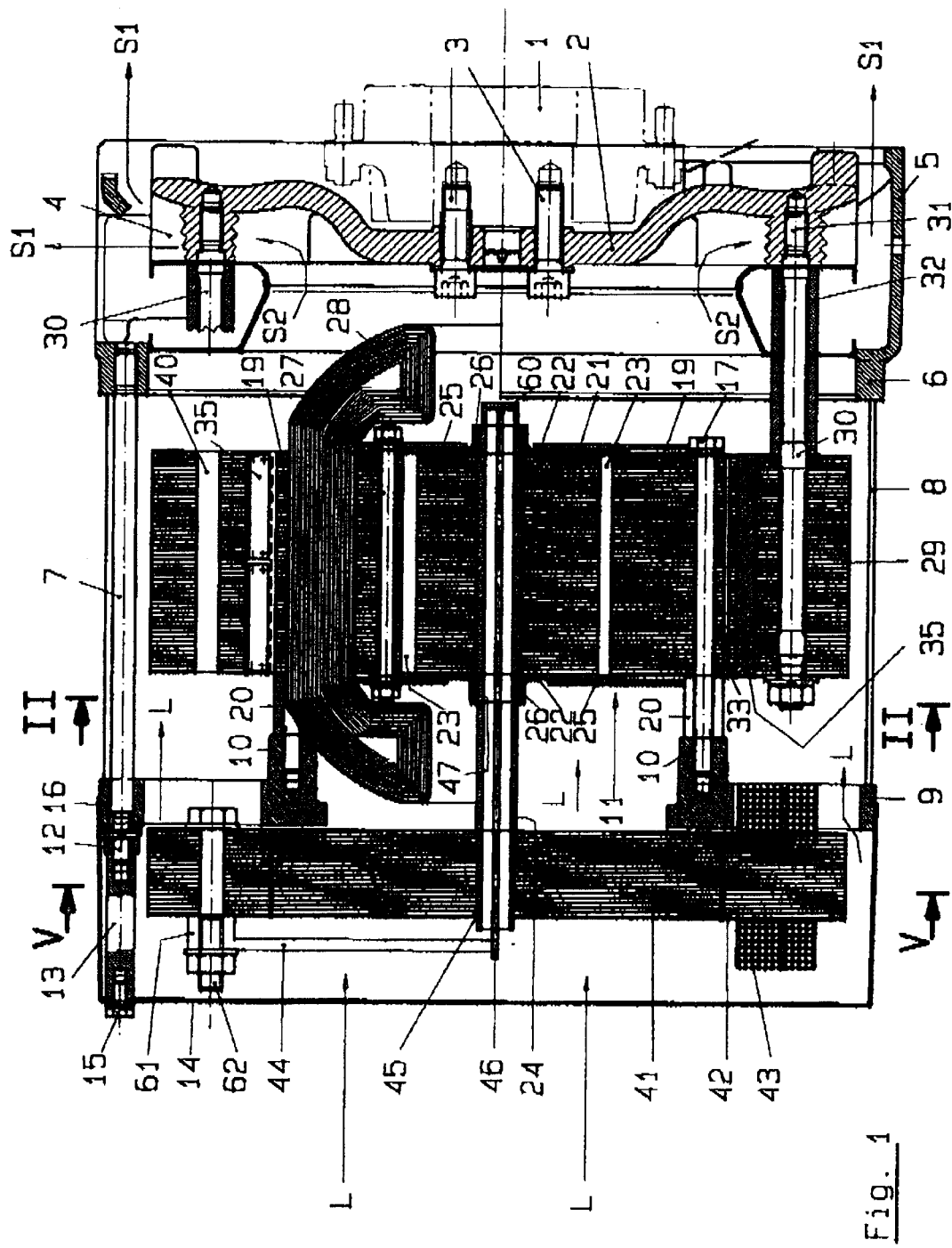

The invention relates to a power generator unit composed of a generator and a piston internal combustion engine as the drive, particularly composed of a synchronous generator and a diesel engine, pursuant to the preamble of claim 1.

Such a power generator unit, combined with a pump unit, is described in DE 19721527.

Usually, power generator units with permanent magnet excitation lack a simple form of regulation to adapt the generator voltage to various load states. In other power generator units, a possibility for regulation technology intervention is provided on the exciter side of the generator, either in the form of slip rings that tend to wear, or by installation of a rotating rectifier with an exciter machine.

In contrast, the present invention is based on the task of avoiding complicated measures of regulation technology. In particular, it is intended to guarantee that predetermined voltage tolerances are adhered to during load changes, in favor of a continuous voltage progression that is essentially independent of the phase position.

This task is accomplished according to a proposal of the invention, in accordance with the characteristic of claim 1.

Because the stator of the generator is divided, according to a proposal of the invention, into an outside stator part that forms an air gap with the rotor, and an inside stator part that forms a control air gap with the outside stator part that surrounds it, it is possible, in simple manner, to control the magnetic flow in the stator by rotating the inside stator part, thereby changing the geometry of the control air gap. By means of such a change of the control air gap as a function of the angle of rotation of the inside stator part, it is possible to achieve a monotonous progression of the magnetic flow, which is proportional to the induced voltage, while adhering to low voltage tolerances.

According to the invention, rotation of the inside stator part takes place in accordance with the load-dependent variations of the terminal voltage of the generator, where the magnetic resistance in the stator decreases as the control air gap becomes increasingly smaller, i.e. vice versa, increases as the control air gap becomes increasingly larger.

For this purpose, the circumference surfaces of the two stator parts that are adjacent to the control air gap can have a plurality of segment-like projections, viewed over the circumference, preferably in such a way that each stator part has at least three segment projections, the contours of which deviate from the circular shape in the opposite direction. This means that with reference to one direction of rotation, the segment projections of the inside stator part increasingly come closer to those of the outside stator part, while in the opposite direction of rotation, they increasingly move apart from one another, increasing the size of the control air gap.

In accordance with another proposal according to the invention, it is provided that the outside stator part is arranged fixed in place on the housing, where it is practical if it is attached to a lid part of the generator housing, and that the inside stator part is held inside it, centered and so as to rotate.

This is advantageously done in that the inside stator part is mounted to rotate with a hollow shaft, which is mounted to rotate in bearing flanges on both sides of the inside stator part, which are connected with the outside stator part, e.g. in such a manner that the bearing flanges are formed on lateral sheathing plates, which are screwed onto the outside stator part.

In structuring the rotation of the inside stator part in accordance with the load-dependent variations of the terminal voltage of the generator, it is provided, according to the invention, that a rotary magnet is mounted on an extension of the hollow shaft on the housing lid side, so as to rotate with it, and that its rotation within an assigned iron yoke attached to the housing is controlled by the yoke winding, which is connected to the generator terminal voltage. In this way, a voltage regulation that is independent of the power factor $\cos \phi$ is achieved.

A particularly advantageous structure of the invention results from the aforementioned arrangement of the inside stator part on a hollow shaft. Almost force-free rotation of the inside stator part by means of the rotary magnet can be achieved by the fact that a torsion rod that is connected with the hollow shaft and acts between the stator and the rotary magnet is designed in such a way that the torsion force corresponds approximately to the magnetic force exercised on the inside stator part by the magnetic field, independent of the angle of rotation. With this adaptation, the geometry of the control air gap, which depends on the angle of rotation, is very important. Practically force-free voltage regulation can be achieved by a corresponding adaptation to the spring force of the torsion rod in the hollow shaft.

Figure 2:
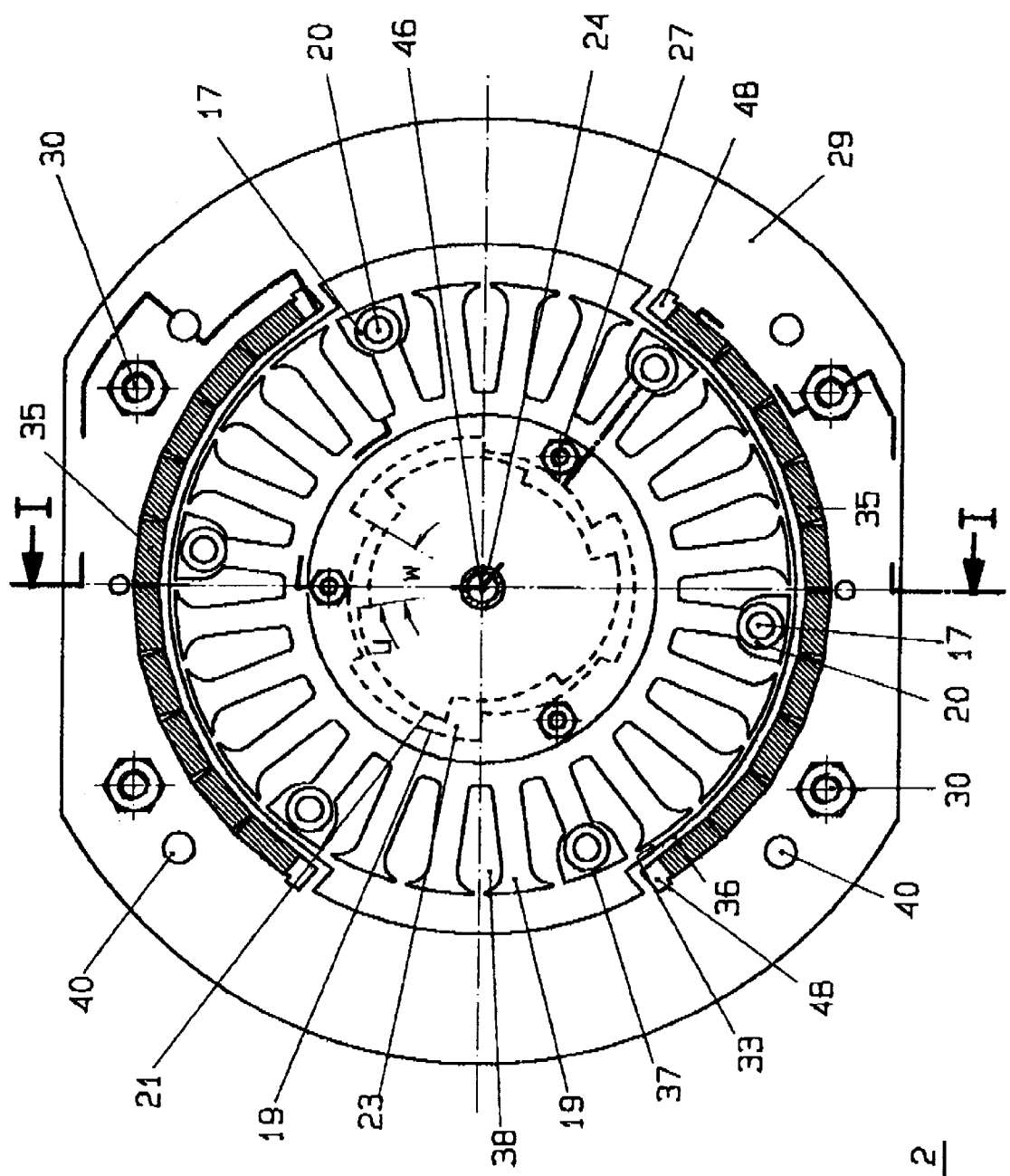
Figure 3:
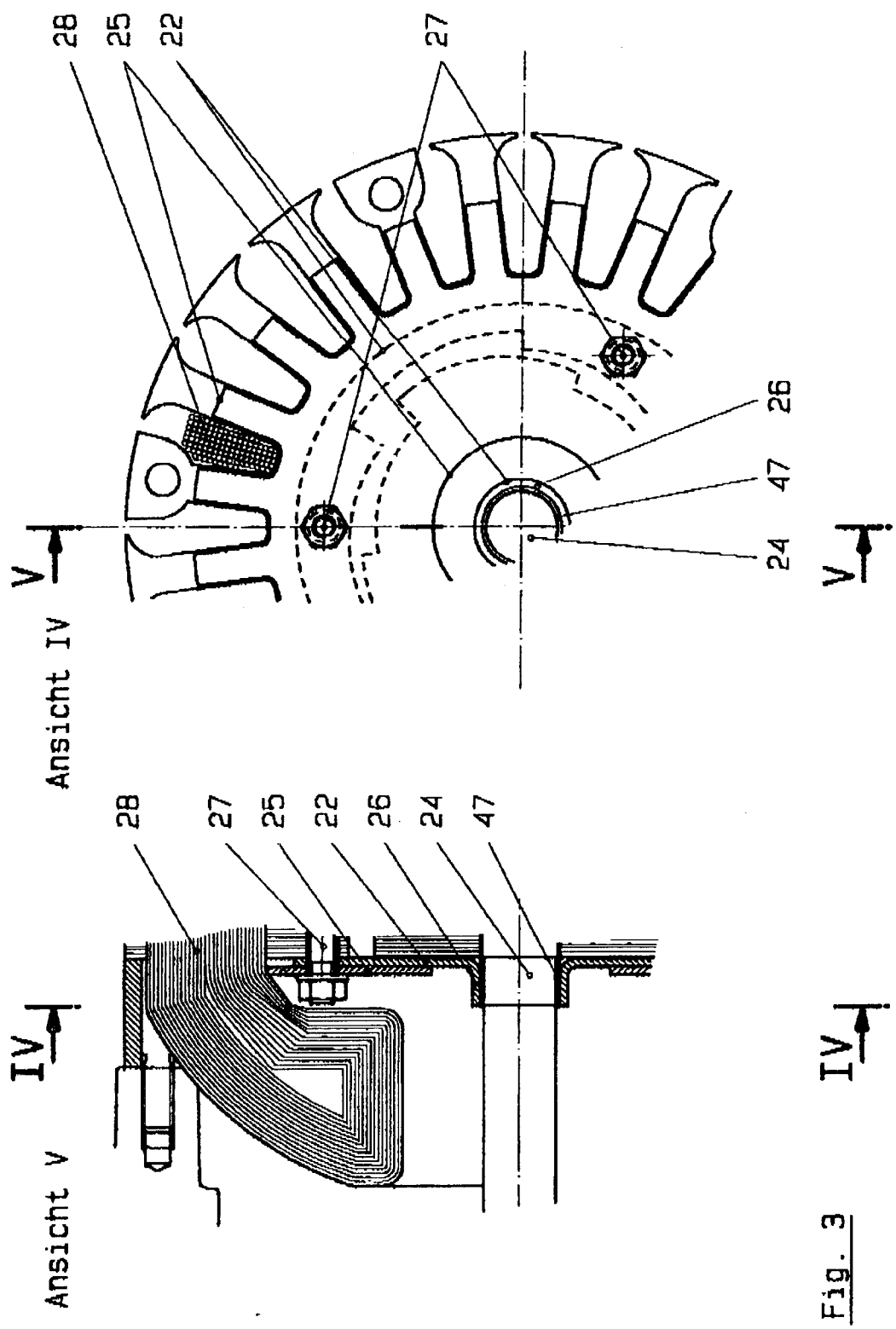
Figure 4:
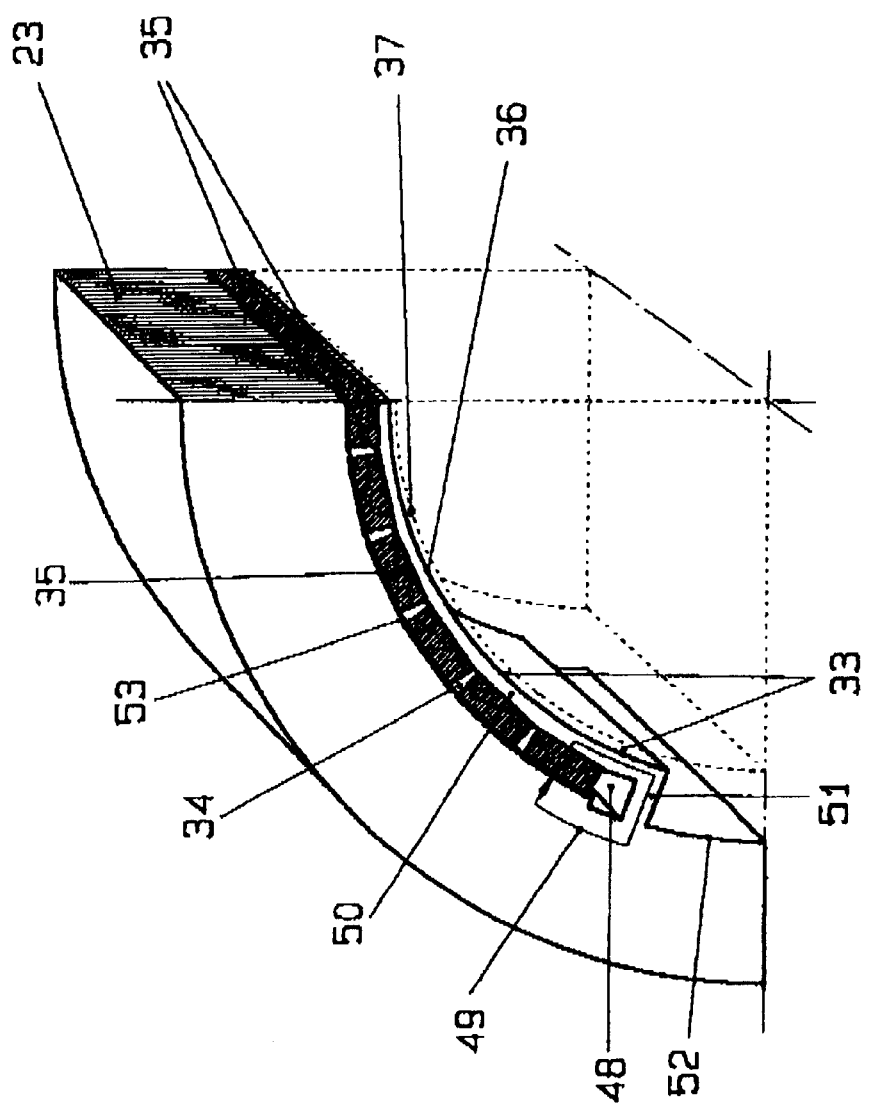
Figure 5:
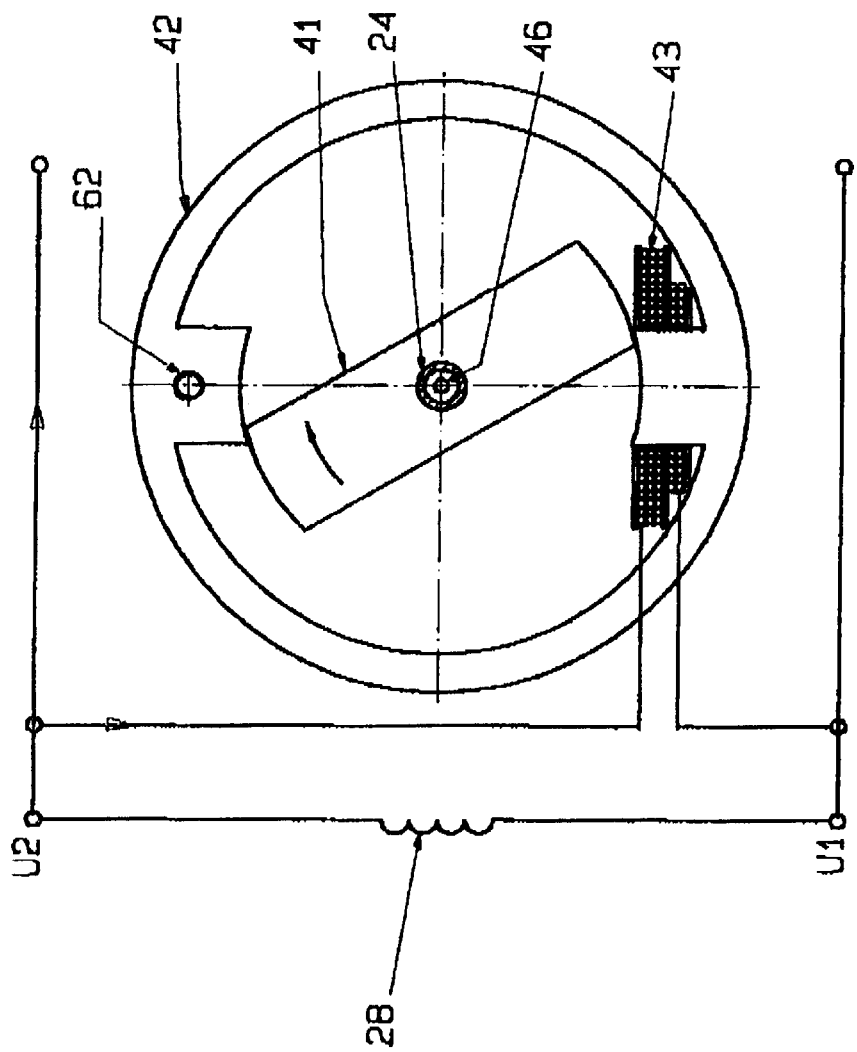

In the following, an exemplary embodiment of the invention will be explained on the basis of the drawing. This shows:

FIG. 1 an axial cross-section through a motor/generator unit according to Section I—I of FIG. 2, FIG. 2 a view of the stator and the rotor of the motor generator unit according to Section II—II of FIG. 1, FIG. 3 a partially axial view of the stator, on a larger scale, corresponding to FIG. 2, FIG. 4 a three-dimensional portion of the rotor with permanent magnets, and FIG. 5 a view of the voltage regulator according to Section V—V of FIG. 1. The electrical machine forming a power generator as shown in FIGS. 1 to 3 relates to a unit composed of a drive motor and a synchronous generator. Preferably, a diesel engine is used as the drive motor, but only the connection-side end of its crankshaft 1 is shown with a broken line. On the face of the crankshaft 1, a fan wheel 2 is attached by means of screws 3. The fan wheel 2 possesses blades 4 to produce an air flow in accordance with arrow S1, for cooling the motor, where the inflowing air according to arrow S2 corresponds to the cooling air flowing out of the generator housing after generator cooling. As shown in FIG. 1, the generator housing lid 9 that is provided on the (current) outflow side possesses intake openings for the cooling air that flows in according to arrows L. In order for this cooling air flow to achieve its full cooling effect in the generator housing 8, the protective hood 14 possesses one or more inlet openings for the cooling air, with an appropriate size (not shown).

A connection housing 5 on the motor side encloses the space in which the fan wheel 2 is housed, radially to the outside; it is open on both sides and, on its side opposite the motor, possesses a ring flange 6 with threaded bores for screwing in attachment screws 7 for connecting the cylindrical generator housing 8, where it is practical if the latter is made of sheet metal, in which flange the housing is clamped in place on both faces, over a flat area. The attachment screws 7 are arranged resting against the inside of the generator housing 8, distributed over its circumference, and pass through the entire housing length. On the outflow side, the left end of the generator housing 8 in the drawing, a generator housing lid 9 is provided, which has an inside lid ring 10 with spokes that project radially inward, to which the stator 11 of the generator is attached. With their outflow-side ends, the shafts of the attachment screws 7 project through bores in the generator housing lid 9; at their free threaded ends 12, screw bolts 13 are screwed on, which serve to attach the generator housing 8 to the generator housing lid 9 as well as to attach the protective hood 14 by means of short screws 15; these are screwed in from the outside, through corresponding bores in the protective hood 14, into threaded bores of the facing ends of the screw bolts 13. The protective hood 14 covers the related free end of the generator housing lid 9 from the outside, with its edge segment 16 that forms the open end.

While eight attachment screws 7 are provided according to the present embodiment, distributed over the circumference, six stator screws 17 are sufficient to attach the stator to the inside lid ring 10, which screws are passed through bores of the sheet-metal package of an outside stator part 19 and are screwed into the lid ring 10 via spacer sleeves 20 between the inside lid ring 10 and the facing side of the outside stator part 19. In this way, the outside stator part 19 is fixed firmly in place on the housing, where the sheet-metal package that forms the outside stator part 19 is secured together by the stator screws 17.

The sheet-metal package that forms an inside stator part 21 is arranged on a hollow shaft 24, so as to rotate with it. The hollow shaft 24 is connected with a torsion rod 46 that is arranged in the shaft axis with pre-stress, via its end cap 60. It is mounted to rotate on bearing bushings 47 in bearing flanges 26 of sheathing plates 22, which are arranged on opposite faces of the sheet-metal package. The end of the torsion rod 46 that lies opposite the end cap 60 is fixed in place on the housing via a rigid rod support 44. Its attachment eye 61 is seated on a screw 62, which secures the sheet-metal package of the iron yoke 42 together. The sheathing plates 22 cover a control air gap 23 between the inside stator part 21 and the outside stator part 19. Since the sheet-metal package that forms the inside stator part 21 is therefore seated on the hollow shaft 24 so as to rotate with it, it also performs its rotation for the purpose of the desired constant regulation of the generator voltage. Adjustment of the inside stator part 21 relative to the outside stator part 19 for the purpose of regulating the generator voltage will be described in further detail below.

The view according to FIG. 2 shows not only the contour of the sheet-metal package that forms the rotor 29, but also the contour of the sheet-metal packages that form the stator, which packages have cut-outs 38 to hold the winding wires of the rotary current winding 28 of the generator, in the region of the outside stator part 19; it does not show the insulation plate 25 shown in FIG. 1, which was left out in order to improve the view. The outside stator part 19 is attached to the inside lid ring 10 shown in FIG. 1, by means of stator screws 17 passed through bores 39 in its sheet-metal package. In accordance with the selected section line, one can also see the spacer sleeves 20, which support the sheet-metal package of the outside stator part 19 against the inside lid ring 10.

Three holding screws 27 serve to center the inside stator part 21 within the outside stator part 19, by means of lateral sheathing plates 22, in the bearing flanges 26 of which the hollow shaft 24 is mounted with the sheet-metal package of the inside stator part 21.

The sheathing plates 22 are also covered by an insulation plate 25, in each instance, towards the outside, in the region of the control air gap 23, which serves to provide electrical insulation of the rotary current winding 28 of the generator, as well as of three holding screws 27 arranged distributed over the circumference, from the sheathing plate 22. The holding screws 27 run through bores in the sheet-metal package that forms the outside stator part 19. They are insulated from the sheet-metal package by means of insulation sleeves, and center the inside stator part 21 relative to the outside stator part 19 via the sheathing plates 22.

The stator 11 is surrounded by the rotor 29, which is also composed of a sheet-metal package, which is secured by means of clamping screws 30, which are screwed into corresponding threaded bores of the fan wheel 2 with a motor-side threaded end 31. Support sleeves 32 pushed onto the clamping screws 30 are secured between the fan wheel and the related side of the rotor 29. In this way, the rotor 29 is connected with the fan wheel 2 so as to rotate with it. On its inside circumference, it forms a narrow air gap 33, with a width of approximately 2 mm, relative to the stator 11. In addition, the rotor 29 has approximately cylindrical pockets 34 that go through in the axial direction, and run within two pole segments, into which magnet elements 35 in the form of narrow ingot-shaped rods are inserted from both sides, specifically, in the present example, as is evident from FIG. 2, two rows of ten magnet elements 35, in each instance, arranged next to one another, which are responsible for the magnetic excitation of the generator. In the region of the pockets 34, the inner contour line 36 of the circumference wall 50 of the rotor 29, which delimits the pockets 34 radially towards the inside, forms the narrow air gap 33, together with the outer contour line 37 of the stator 11. Bores 40 in the rotor plates serve for installation of a starter (not shown).

In accordance with FIGS. 2 and 4, the magnet elements 35 are pushed into the pockets 34 axially, so that they form the two poles lying next to one another, distributed in polygon shape. The subdivision of the permanent magnets for the poles into small magnet elements 35 allows them to be produced in economically efficient manner; their installation is greatly facilitated by means of a suitable magnetic ground 49, because in this way the mutual repulsion of adjacent magnet elements 35 is practically eliminated. The individual magnet elements 35 can be pushed into the pockets 34 practically without any force. In this connection, no special attachment of the magnet elements 35 is required, since they are held in the axial direction by their magnetic forces during operation, and are supported in the pockets, viewed in the radial direction, so that they can easily withstand the centrifugal forces that occur during operation.

In the three-dimensional representation of the magnet arrangement according to FIG. 4, a cavity 48 is provided at the end of the cut-out in which the magnet elements 35 are seated. Without this cavity 48, the extraordinarily great flow density in this region would result in magnetic reversal in the case of a surge short-circuit of the generator, and therefore in destruction of the outside magnet element 35. By structuring the cavity 48 with a defined magnetic ground 49, this magnetic reversal can be prevented. The cavity 48 is formed by an extension of the inside circumference wall 50 of the pockets 34 and a bridge 51 adjacent to the pole gap 52, through which the magnetic ground 49 runs. Ribs 53 that run axially on the insides of the pockets 34 define the distances between the magnet elements 35.

FIG. 3 shows an enlarged portion of FIG. 2, to make the illustration more clear, where parts that agree with one another are designated with the same reference symbol. Insulation plate 25 and sheathing plate 22, which serves to position the inside stator part 21, are indicated with reference lines at the outside and inside contour in FIG. 3, in each instance. The bearing bushing 47 is shown from the face side. In a portion 38 of the outside stator part 19, winding wires of the rotary current winding 28 are shown in cross-section.

The changeable control air gap 23 between the outside stator part 19 and the inside stator part 21 is essential for the principle of functioning of the voltage regulation of the generator. The circumference surfaces of the inside stator part 21 that are adjacent to the control air gap 23, on the one hand, and those of the outside stator part 19, on the other hand, are structured with three segments over the circumference, where the three individual segments have projecting circumference segments that run approximately in screw shape, deviating from the circular shape. For example, the control air gap 23 becomes narrower, if one turns the inside stator part 21 relative to the outside stator part 19, in the clockwise direction, in accordance with the arrow U (FIG. 2), starting from the position shown with broken lines, where the end position is reached approximately at a path of rotation in accordance with the angle w. In this end position, the control air gap 23 is the smallest it can be.

By turning the inside rotor part 21 relative to the outside rotor part 19, the geometry of the control air gap 23 and therefore the magnetic resistance in the stator 11 are changed. This circumstance is utilized in the present permanently excited synchronous machine to regulate the voltage. By changing the magnetic flow as described, it is possible to regulate the induced voltage, where there is a direct proportionality between the latter and the magnetic flow. Because of the fact that the inside stator part 21 is seated on a hollow shaft 24 with a pre-stressed torsion rod 46, torsion forces that counteract the force effects of the magnetic field on the inside stator part 21 are mobilized, so that the rotation of the inside stator part 21 relative to the outside stator part 19 that is applied for the purpose of voltage regulation can take place almost without force, using a rotary magnet 41. However, this presumes that the torsion pre-stress is adapted to the magnetic resetting force.

The rotary magnet 41 shown in FIGS. 1 and 5 is arranged on the inside of an iron yoke 42, which carries a winding 43 controlled by the generator terminal voltage. In this connection, voltage variations at the generator winding result in a rotation of the rotary magnet 41, and thereby cause the desired constant regulation of the voltage by means of a relative rotation between the two stator parts. In accordance with FIG. 1, the rotary magnet 41 is overmounted on the related end of the hollow shaft 24, which in turn is connected to rotate with the inside stator part 21. The rotary magnet 41 is seated centered on a bearing segment 45 at the end of the hollow shaft 24, and is pressed against a shoulder of the hollow shaft 24 there. Preferably, the rotary magnet 41 with the related yoke 42 are each formed from sheet metal.

In accordance with FIG. 5, the electrical circuit for activation of the rotary magnet 41 is also drawn in. The winding 43, which is affixed at one of the poles of the iron yoke 42, is applied to the terminal voltage U1, U2 of the generator winding 28. In this connection, the magnetic flow is directly proportional to the induced voltage and controls the rotation of the rotary magnet 41 and also of the inside stator part 21, via the hollow shaft 24, causing the geometry of the control air gap 23 and therefore the magnetic resistance in the stator 11 to be changed. The result is simple regulation of the terminal voltage of the generator, independent of the power factor cos φ.

What is claimed is:

1. Power generator unit composed of a generator and a piston internal combustion engine as the drive, particularly composed of a synchronous generator and a diesel engine, where the rotor (29), as an external rotor, is driven by the crankshaft (1) of the diesel engine, and carries permanent magnets (35) to excite the generator, and where the stator (11) of the generator is arranged within the rotor (29) and carries the rotor winding (28) of the generator, characterized in that the stator (11) of the generator is divided, for the purpose of voltage regulation, into an outside stator part (19) that forms an air gap (33) with the rotor (29), and an inside stator part (21) that forms a control air gap (23) with the outside stator part (19) that surrounds it, and is mounted to rotate, relative to the outside stator part (19), in such a manner that the geometry of the control air gap (23) changes with the rotational position, and that the rotation takes place as a function of the variations in the terminal voltage of the generator.

2. Power generator unit according to claim 1, characterized in that the circumference surfaces of the two stator parts (19, 21) that are adjacent to the control air gap (23) can have a plurality of segment-like projections, viewed over the circumference.

3. Power generator unit according to claim 2, characterized in that each stator part (19, 21) has at least three segment projections, the contours of which deviate from the circular shape in the opposite direction.

4. Power generator unit according to claim 1, characterized in that the outside stator part (19) is arranged fixed in place on the housing, and that the inside stator part (21) is held inside it, centered and so as to rotate.

5. Power generator unit according to claim 4, characterized in that a the inside stator part (21) is mounted to rotate with a hollow shaft (24), which is mounted to rotate in bearing flanges (26) on both sides of the inside stator part (21), which flanges are fixed to the outside stator part (19).

6. Power generator unit according to claim 5, characterized in that the bearing flanges (26) are formed on lateral sheathing plates (22), which are screwed onto the outside stator part (19).

7. Power generator unit according to claim 5, characterized in that a rotary magnet (41) is seated on an extension of the hollow shaft (24) on the housing lid side, whose rotation within an iron yoke (42) attached to the housing is controlled by its winding (43), which is connected to the generator terminal voltage.

8. Power generator unit according to claim 7, characterized in that a torsion rod that is connected with the hollow shaft (24) and acts between the stator and the rotary magnet (41) is designed in such a way that the torsion force corresponds approximately to the magnetic force exercised on the inside stator part (21) by the magnetic field, in such a way that rotation of the inside stator part (21) by the rotary magnet (41) can take place almost without force.

* * * * *